United States Patent [19]

Sarver et al.

[11] Patent Number: 5,702,656

[45] Date of Patent: Dec. 30, 1997

[54] PROCESS FOR MAKING POLYMERIC ARTICLES

[75] Inventors: David Sarver, Logansport; Keith D'Alessio, Warsaw, both of Ind.; Raymond A. D'Alessio, Madison, Conn.

[73] Assignees: United States Surgical Corporation, Norwalk, Conn.; Biomet, Inc., Warsaw, Ind.

[21] Appl. No.: 473,186

[22] Filed: Jun. 7, 1995

[51] Int. Cl.$^6$ .................. B29C 39/24; B29C 43/56; B29C 55/24

[52] U.S. Cl. .................. 264/102; 264/85; 264/126; 264/209.5; 264/210.2; 264/211.21; 264/320; 264/323; 264/288.4

[58] Field of Search ............... 264/101, 102, 264/211.21, 209.5, 166, 85, 323, 210.2, DIG. 56, 288.4, 320, 126

[56] References Cited

U.S. PATENT DOCUMENTS

| | | |
|---|---|---|
| 2,392,929 | 1/1946 | Lee . |
| 2,479,727 | 8/1949 | Daniels . |
| 2,719,330 | 10/1955 | Stott .................. 264/211.21 |
| 2,747,224 | 5/1956 | Koch et al. . |
| 2,808,623 | 10/1957 | Foster .................. 264/496 |
| 2,874,412 | 2/1959 | Flemming et al. . |
| 2,911,678 | 11/1959 | Brunfeldt .................. 264/102 |
| 2,922,194 | 1/1960 | Lampard et al. . |
| 2,941,240 | 6/1960 | Distler . |
| 3,002,331 | 10/1961 | Denney . |
| 3,051,993 | 9/1962 | Goldman et al. . |
| 3,205,290 | 9/1965 | Covington, Jr. et al. .......... 264/209.5 |
| 3,294,757 | 12/1966 | Church .................. 264/DIG. 56 |
| 3,297,033 | 1/1967 | Schmitt et al. . |

(List continued on next page.)

FOREIGN PATENT DOCUMENTS

| | | |
|---|---|---|
| 321176 | 6/1989 | European Pat. Off. . |
| 1933798 | 1/1971 | Germany .................. 264/166 |
| 3943612 | 7/1993 | Germany . |
| 5237177 | 9/1993 | Japan . |

OTHER PUBLICATIONS

Encyclopedia of Polymer Science and Engineering, vol. 4, (John Wiley 7 Sons, New York) c. 1986, pp. 812-831.
Encyclopedia of Polymer Science and Engineering, vol. 6, (John Wiley & Sons, New York), c. 1986, pp. 571-631.
Encyclopedia of Polymer Science and Engineering, vol. 8, (John Wiley & Sons, New York), c. 1987, pp. 101-139.
Encyclopedia of Polymer Science and Engineering, vol. 2, (John Wiley & Sons, New York) c. 1985, pp. 692-706.
Joziasse, et al., *Polymer Bulletin*, Supertough poly(lactide)s, 1994, 599-605.
Grijpma, et al., *Polymer Engineering and Science*, Rubber Toughening of Poly(Lactide) by Blending and Block Copolymerization, Nov., 1994, vol. 34, No. 22, pp. 1674-1684.

*Primary Examiner*—Jeffery R. Thurlow

[57] ABSTRACT

Processes for fabricating substantially void-free polymeric articles are provided. In one embodiment, a polymer melt is formed followed by extrusion through a die to form a polymeric extrudate. The polymeric extrudate is directly discharged vertically upward into an open-ended mold the open-ended mold having a longitudinal axis oriented substantially vertically. The polymeric article is cooled and removed from the mold. In a further embodiment, a mold is loaded with polymeric particles. The mold is oriented such that its longitudinal axis is substantially vertical. A vacuum is drawn on the loaded mold followed by heating the loaded mold above the melting point of the polymeric particles. After the polymeric particles are melted, the loaded mold is charged with an inert gas to above ambient pressure to collapse any remaining voids. The loaded mold is slowly cooled to form a polymeric article. Oriented polymeric bioabsorbable cannulated surgical articles and a method of making same are provided. Also provided are methods and articles having polymeric material which has been oriented radially and optionally further oriented axially.

15 Claims, 8 Drawing Sheets

U.S. PATENT DOCUMENTS

| Number | Date | Name | Ref |
|---|---|---|---|
| 3,329,751 | 7/1967 | Slicker et al. . | |
| 3,387,072 | 6/1968 | Leitch | 264/210.2 |
| 3,417,178 | 12/1968 | Downing et al. . | |
| 3,422,181 | 1/1969 | Chirgwin . | |
| 3,423,488 | 1/1969 | Bowser . | |
| 3,551,545 | 12/1970 | Overdiep | 264/323 |
| 3,565,869 | 2/1971 | DeProspero . | |
| 3,620,218 | 11/1971 | Schmitt et al. . | |
| 3,626,948 | 12/1971 | Glick et al. . | |
| 3,636,956 | 1/1972 | Schneider . | |
| 3,739,773 | 6/1973 | Schmitt et al. . | |
| 3,753,661 | 8/1973 | Simons . | |
| 3,767,748 | 10/1973 | Rosette . | |
| 3,772,420 | 11/1973 | Glick et al. . | |
| 3,792,010 | 2/1974 | Wasserman et al. . | |
| 3,851,863 | 12/1974 | Wallis | 264/349 |
| 3,878,284 | 4/1975 | Schmitt et al. . | |
| 3,890,283 | 6/1975 | Casey et al. . | |
| 3,947,203 | 3/1976 | Rose . | |
| 3,983,203 | 9/1976 | Corbett | 264/150 |
| 4,252,696 | 2/1981 | McQuarrie . | |
| 4,490,326 | 12/1984 | Beroff et al. . | |
| 4,496,446 | 1/1985 | Ritter et al. . | |
| 4,523,591 | 6/1985 | Kaplan et al. . | |
| 4,534,003 | 8/1985 | Manzione . | |
| 4,650,488 | 3/1987 | Bays et al. . | |
| 4,655,777 | 4/1987 | Dunn et al. | 623/16 |
| 4,675,141 | 6/1987 | Kumazaki . | |
| 4,743,257 | 5/1988 | Tormala et al. . | |
| 4,808,351 | 2/1989 | Mukherjee et al. . | |
| 4,824,627 | 4/1989 | Hammer et al. . | |
| 4,898,186 | 2/1990 | Ikada et al. . | |
| 4,950,295 | 8/1990 | Weigum et al. . | |
| 4,968,317 | 11/1990 | Tormala et al. . | |
| 4,968,474 | 11/1990 | Ito . | |
| 5,007,939 | 4/1991 | Delcommune et al. . | |
| 5,028,377 | 7/1991 | Hendry . | |
| 5,037,928 | 8/1991 | Li et al. . | |
| 5,039,463 | 8/1991 | Loren . | |
| 5,047,183 | 9/1991 | Eckhardt et al. . | |
| 5,100,379 | 3/1992 | Wendell | 264/209.5 |
| 5,110,533 | 5/1992 | Hendry . | |
| 5,112,563 | 5/1992 | Baxi . | |
| 5,275,854 | 1/1994 | Maier et al. . | |
| 5,529,736 | 6/1996 | Shalaby et al. | 264/323 |
| 5,562,704 | 10/1996 | Tamminmaki et al. | 606/213 |

5,702,656

PROCESS FOR MAKING POLYMERIC ARTICLES

BACKGROUND

1. Technical Field

This disclosure relates to polymeric articles, processes for making polymeric articles and, more particularly, processes for forming polymeric articles which are substantially free of internal voids. In another aspect, this disclosure relates to oriented polymeric cannulated articles.

2. Background of Related Art

The formation of polymeric articles often requires preparation of a polymer melt followed by molding of the molten polymer into a desired shape. Examples of processes involving object fabrication from molten polymers include extrusion and injection molding. When producing polymer articles of relatively large thicknesses using such processes, internal voids often form during cooling.

In conventional polymer processes such as extrusion, it is necessary to quickly cool the polymer to impart a degree of mechanical strength as it exits the die. Cooling assists in maintaining the shape of the formed part and allows it to withstand further handling. However due to low thermal conductivity, internal voids develop when the exterior skin of a polymeric article cools and hardens before the interior of the article. As the polymeric article interior cools, it shrinks. The interior, constrained by the rigid exterior skin, pulls away from the center. Internal voids are formed during this cooling process.

The effects of differential shrinkage on molded parts is discussed in the chapter entitled "Injection Molding" in Volume 8 of *The Encyclopedia of Polymer Science and Engineering*, (Wiley Interscience, New York), c. 1987, pp. 102–138, the disclosure of which is incorporated herein by reference.

In many instances, polymeric articles formed by a process yielding internal voids are used as the starting materials for further molding or machining operations. When precise dimensions and superior mechanical strength are required, the use of starting polymeric materials having internal voids may result in unacceptably high product failure rates.

There is a need in the art for techniques which permit the fabrication of relatively thick polymeric articles without the formation of internal voids. Such polymeric articles could be used as-formed or as stock for further high-precision molding or machining operations.

Medical devices such as prosthetics frequently require precise dimensions and carefully engineered mechanical strength. For example, bone pins, screws, tacks, staples, plates, nails and other surgical fixation devices are used for repair of fractures in bone and tears in cartilage or other connective tissue. The elastic modulus, tensile strength and other stress bearing properties should be carefully regulated to approximate the characteristics of the tissue they replace or to which they are applied. Failure to do so may result in uneven distribution of stress and strain around the repair site. In the case of osteosynthesis devices such as bone pins, screws, etc., bioabsorbable materials have been found to be particularly useful. Such bioabsorbable devices should be sufficiently rigid to maintain stability and alignment of one tissue fragment in relation to another tissue fragment, e.g., in bone repair, yet still be sufficiently flexible to promote formation of connective bone tissue.

Initially, certain bioabsorbable bone fixation devices were considered unacceptable due to insufficient elasticity and failure to maintain the strength necessary to maintain proper alignment during the bone regeneration period. Attempts have been made to impart increased strength and elasticity to solid core bone fixation devices, by stretching or drawing to increase orientation of the molecular structure, e.g., see U.S. Pat. Nos. 5,007,939, 4,968,317, 4,898,186 or European Patent App. Pub. No. 0 321 176 A2.

Bone fixation devices are usually relatively thick and are often formed from rod stock. The ability to form void-free rods allows better control over both the rigidity and elasticity of prosthetic devices formed from such rods.

Certain bone fixation devices are cannulated to facilitate placement of a screw or intermedullary nail by allowing a surgeon to insert a drill wire or the like into the fracture site, see e.g., U.S. Pat. No. 4,175,555. It is important that such cannulated bone fixation devices be strong enough to withstand the stress associated with fixation at the repair site. Moreover, the material surrounding the cannula should withstand the rigors of manufacture without loss of strength or deformation.

U.S. Pat. No. 4,898,186 describes an osteosynthetic pin obtained by shaping a poly-L-lactic acid having a molecular weight of at least about 70,000 and axially drawing the shaped body about 2 to about 10 times at an elevated temperature of about 70° to about 120° C. A bore which extends through the pin may be provided. However, the machining of a bore in an oriented polymeric rod is difficult because the oriented rod is dimensionally unstable at temperatures above the glass transition temperature. Heat generated by friction between a drill bit and the osteosynthetic pin causes the oriented molecules to reposition themselves to relieve stress. This causes the pin to shrink in length, swell in thickness or diameter, and lose at least some of the strength gained by orientation of the rod.

Japanese published unexamined application (Kokai) JP 5237177 is directed to a bone bonding material having through hole(s). As described in the abstract, a long and narrow molding of polylactic acid having a core wire penetrating through it in the long axis is drawn at from the glass transition point to the melting point, and then the core wire is drawn out. Although the process is described as resulting in high accuracy and high mass production, insertion and removal of the core wire may be cumbersome in commercial practice.

German published application DE 3943612 is directed to resorbable implant production. As described in the abstract, a process for producing a body implant of a resorbable plastic material includes drawing the plastic material at a temperature above the melting point from an extruder and increasing its strength by stretching it. Stretching takes place immediately after drawing off from the extruder. The extrudate is described as being in the form of a hollow tube or rod. Although the process is described as simple and reliable, the hollow tube or rod may be subject to undesirable deformation during stretching at what appear to be temperatures just below the melting point of the polymer.

There is a need for techniques which permit formation of oriented cannulated surgical fixation devices that can reliably withstand the rigors of commercial manufacture. Such surgical fixation devices are well suited for use in surgical repair of damaged body parts and in cosmetic surgery.

SUMMARY

An improved process for the fabrication of polymer articles which removes the requirement to cool quickly in order to impart mechanical strength is provided. Polymer articles are formed which are substantially free of internal voids. In one embodiment, a polymer melt is formed followed by extrusion through a die to form a polymeric extrudate. The polymeric extrudate is directly discharged vertically upward into an open-ended mold the open-ended mold having a longitudinal axis oriented substantially vertically. The polymeric article is cooled and removed from the mold. In a further embodiment, a mold is loaded with polymeric particles. The mold is oriented such that its longitudinal axis is substantially vertical. A vacuum is drawn on the loaded mold followed by heating the loaded mold above the melting point of the polymeric particles. After the polymeric particles are melted, the loaded mold is charged with an inert gas to above ambient pressure to collapse any remaining voids. The loaded mold is slowly cooled to form a polymeric article.

In another aspect, an oriented, biocompatable and optionally bioabsorbable polymeric article is manufactured by a process comprising providing a polymeric body having a hollow core, heating the polymeric body and radially orienting the heated polymeric body. In yet another aspect, a biocompatable polymeric article is oriented radially and axially.

DETAILED DESCRIPTION OF THE PREFERRED EMBODIMENTS

Figure 1:
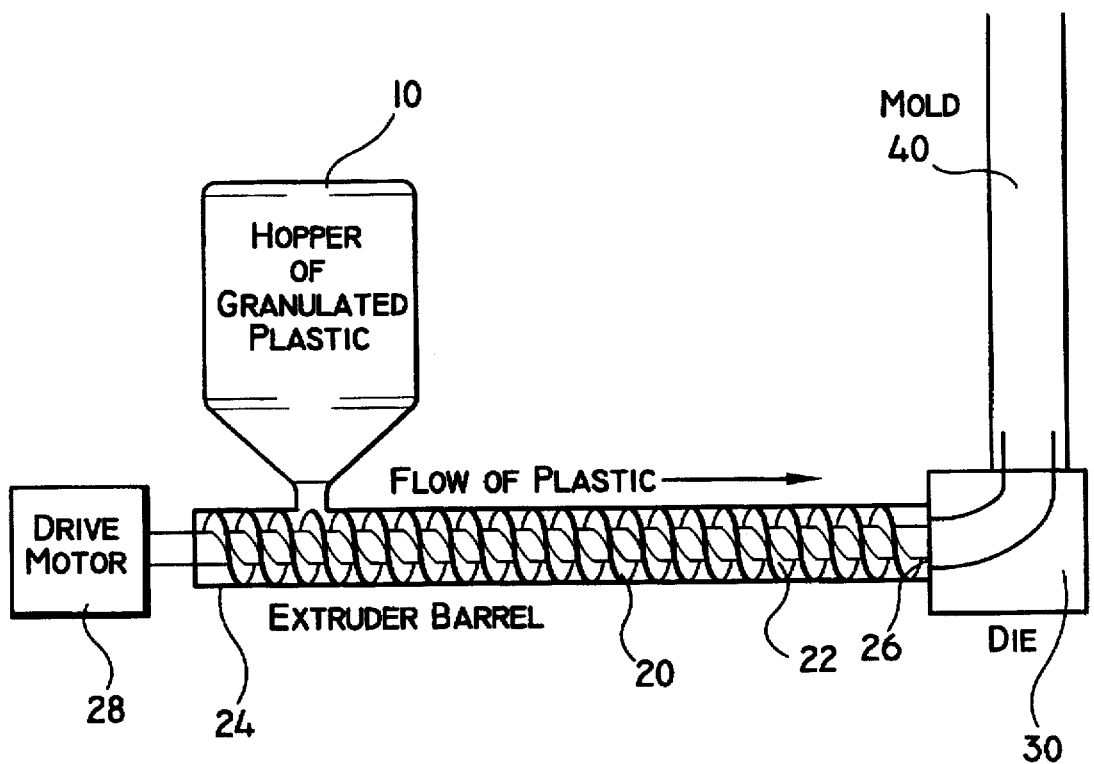
FIG. 1 is a schematic representation of an apparatus used for a polymeric article fabrication process according to one embodiment herein.

Referring now in specific detail to the drawings, FIG. 1 illustrates an apparatus for forming substantially void-free rods according to a first embodiment herein. In this process, polymer particles in suitable forms which include pellets, beads, granules, powder, and/or flakes are supplied through hopper 10 to a conventional extruder 20. Extruder 20 may be selected from any of the well known and commercially available extruding apparatus, examples of which include plunger, single screw and twin screw extruders. Illustrated in FIG. 1 is a single screw 22 extruder. Alternatively, a vertical extruder can be used. These and other suitable extruding apparatus are described in "Extrusion" from Vol. 6 of the *Encyclopedia of Polymer Science and Engineering*, (Wiley Interscience, New York), c. 1986, pp. 570–631, the disclosure of which is incorporated by reference herein. Although the use of extruders is preferred, any method of delivering a molten polymer under pressure to the bottom of a mold may be employed.

Drive motor 28 rotates screw 22 within barrel 24 to mix and drive the polymer particles toward extruder exit 26. The particles are melted to form a homogenous polymer melt stream. Melt temperatures and screw rotation speeds vary for the type of polymer and the type of extruder and are readily optimized by those skilled in the art. Equations and empirical considerations to assist in obtaining optimum extruder performance are given in the chapter entitled "Extrusion," referenced above.

The extruder 20 delivers the homogenous polymer melt to die 30. To reorient the polymer melt from a horizontal flow to an upward vertical flow, die 30 is a side-fed die. Within the die, a mandrel may be provided to orient the polymer melt to provide a uniform exit flow.

When forming a polymeric body such as a cannulated rod, a die, e.g., with an annular exit cross section may be provided. In such a die, a manifold is used to create plural flow paths. The flow is passed around a mandrel and exits as an annular flow. It is contemplated that any cross-sectional profile is appropriate in accordance herein. For example, square, rectangular, circular, ellipsoidal, polygonal, etc. profiles may be incorporated. The mandrel may also incorporate a variety of cross-sectional profiles. It is further contemplated that the external cross-sectional aspect may be configured differently from the internal cross-sectional aspect of the cannula, e.g., a polygonal cannula and a round exterior. Examples of die designs for producing desired cross-sectional profiles and empirical and theoretical considerations of die design are discussed in "Die Design," from Vol. 4 of the *Encyclopedia of Polymer Science and Engineering*, (Wiley Interscience, New York), c. 1986, pp. 812–822, the disclosure of which is incorporated herein by reference. Such polymeric bodies may be used as is or as stock in the manufacture of finished polymeric articles.

The polymer melt exits the die 30 as a polymer extrudate and is directly discharged into open-ended mold 40. By the term "directly" it is meant that there is essentially no gap between die 30 and mold 40. Illustratively, mold 40 is an open-ended tube. However, any desired mold shape may be employed. The mold is oriented with its longitudinal axis substantially vertical, parallel to the direction of polymer flow. By discharging the polymer extrudate vertically upward, the material flows evenly. By providing an even upward flow, polymer does not splash against the mold walls. Polymer splash can cool and harden, forming inclusions which are weakly bound to the remainder of the polymeric article.

Mold 40 may be heated or unheated. Heated molds permit a longer polymeric article to be fabricated. The use of a heated mold may also result in polymeric articles having a higher degree of crystallinity. The polymer flows upward into open-ended mold 40, traversing the entire mold length. The flow of polymer then terminates. The filled mold may then be permitted to cool in situ or the filled mold may be removed from the extruder die and allowed to cool.

To form a cannulated article in mold 40, a metal rod (not shown) may be located in mold 40. The polymer fills the mold and cools to a solid. Then the rod is heated and pulled out of the mold 40 either before or after removing the polymer from the mold. The rod may optionally be coated with a compound that reduces friction such as Teflon® or a silicone derivative.

Although depicted as a single mold, plural molds may be employed in the process disclosed herein. When using multiple molds, a suitable manifold system is provided to ensure an even polymer flow to each of the molds.

In accordance with one illustrative embodiment, a copolymer of glycolide and lactide (about 18/82 wt %) is staged in a vacuum hopper at from about 40°–80° C. (preferably about 60° C.) and less than about 150 milliTorr (preferably less than about 100 milliTorr) pressure using a convection oven. The vacuum hopper is then backfilled with an inert gas such as nitrogen at from between about 10–30 psig (preferably about 20 psig). The vacuum hopper is then sealed and disconnected from the convection oven and connected to the feed section of an extruder. The extruder is purged with a dry inert gas such as nitrogen for more than about 10 minutes, e.g., at least about 15 minutes. Temperature settings are made on two extruder zones and the die in the range of about 170°–210° C. (preferably between about 180°–200° C.) and when the temperature has stabilized a Teflon® tube or mold is placed vertically onto the die and secured, e.g., with a hose clamp or such other suitable securing devices as one skilled in the art would incorporate. The copolymer is extruded by engaging the motor drive of the extruder and extruding in an upward direction at between about 5–20 RPM. When the Teflon® tube or mold is filled with the molten polymer the extruder is stopped and, after sufficient coalescence, the resulting polymeric article is removed for further processing.

Figure 2:
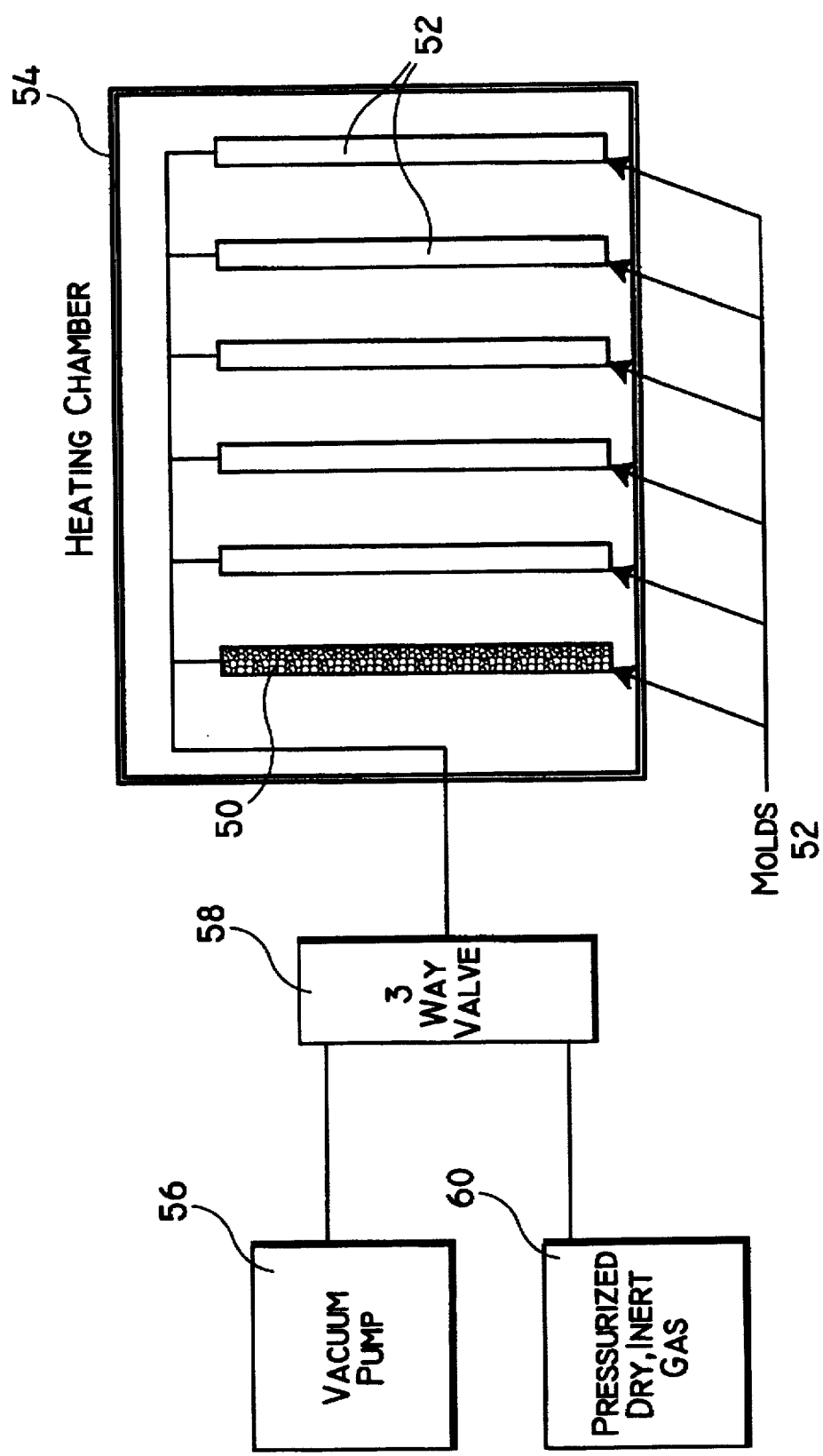
FIG. 2 is a schematic representation of an apparatus used for a polymeric article fabrication process according to a further embodiment herein.

FIG. 2 depicts another embodiment of the polymeric article fabrication technique herein. In this process, suitable polymer particles 50 in which include forms as pellets, beads, granules, powder, and/or flakes are supplied to a series of molds 52. The molds are placed in heating chamber 54 oriented so that the longitudinal axes of the molds are vertical. Although the use of a heating chamber is desirable, other heating sources, such as individually heated molds, may be employed. Any method which can evenly heat molds 52 is contemplated for use in the present process.

Molds 52 are connected to a vacuum source 56 through a three-way valve 58. The valve 58 is switched to vacuum source 56 and the filled molds are evacuated. Preferably, the polymer particles are dried in situ by heating the molds to a point below the polymer melting point while under vacuum in heating chamber 54.

Optionally, following the drying of the polymer particles, the three-way valve may be switched to inert gas source 60. Preferably, inert gas source 60 is nitrogen supplied at above ambient pressure to molds 52. The molds are backfilled with pressurized nitrogen to compress polymer particles 50 within molds 52.

The temperature of heating chamber 54 is raised to a temperature above the melting point of the polymer particles being molded. Vacuum continues to be drawn on molds 52 during melting of polymer particles 50. Polymer particles melt from the interior mold surface inward. As the polymer particles melt, molten polymer flows to the bottom of the mold under gravity. Particles in the mold core are the last to melt, providing a path for the exit of trapped gas. Because the vacuum is maintained during melting, any gas exiting through the core of unmelted particles is evacuated.

In a preferred embodiment of the process, the mold is constructed such that the time required to heat the core portion of the polymer particles varies along the length of the mold. The design is such that core particles will melt most quickly at the lower portions of the mold and most slowly at the upper portions of the mold. This differential melting can be accomplished in a variety of ways: by varying the mold thickness along the mold length, by varying the amount of insulation along the mold length, or by differential heating of the mold along the mold length. The melting should be sufficiently gradual to give gases a path and time to escape from the particles as they melt. The path is formed by unmelted particles.

By performing differential melting along the mold length, the material at the bottom of the mold melts first and the material at the top of the mold melts last. The boundary between melted and unmelted polymer will be conical in shape due to the combination of position along the mold length and the distance from the inner mold wall. This configuration provides the maximum opportunity for escape of trapped gas during formation of the polymeric article.

After all the polymer particles have melted, three-way valve 58 is switched to inert gas source 60. Pressurized nitrogen is supplied to molds 52 to collapse any small voids which may have formed during melting of the polymer particles. The heating chamber 54 is turned off and the polymer within the molds is permitted to slowly cool. Slow cooling minimizes any temperature differentials across the thickness of the mold, avoiding the void formation associated with large cooling differentials, discussed above.

In an illustrative embodiment, Teflon® tubing of an appropriate preselected diameter is cut to a desired length, e.g., about three feet. One end of the tube is plugged and secured with a hose clamp. The plugged tube is then filled with granules of a copolymer of glycolide and lactide (about 18/82 wt %). The upper end of the tube is attached to the vacuum/inert gas (e.g., nitrogen) plenum of a convection oven and the tube is evacuated and the temperature set to between about 50°–70° C. (preferably about 60° C.). The tube is allowed to remain under vacuum and controlled temperature for a minimum of 10 hours. After the sufficient time has passed the oven temperature is set to about 170°–200° C. When the granules soften, the tube is backfilled with low pressure inert gas (e.g., nitrogen). When the granules have become completely molten and flowed to the bottom of the tube, the gas pressure is increased to between about 70–90 psi (preferably 80). After about 10 minutes the oven temperature is changed to between about 10°–30° (preferably 20° C.) until the tubes have cooled. The molded polymer is then removed from the tube and may be subjected to further processing.

The polymeric article formation processes may be practiced with any known polymeric material, particularly thermoplastic polymeric materials. Such thermoplastic polymeric materials include polyethylene, polyproplyne, polysulfone, polymethylmethacrylate, polyamide, polyethylene terephthalate and polybutylene terephthalate. The above processes are particularly suitable for the molding of articles of bioabsorbable polymers. The terms "bioabsorbable" or "resorbable" are interchangeable and used to describe polymers which may be implanted into a living organism and, over a period of time, are degraded and absorbed by the organism. Classes of bioabsorbable polymers include but are not limited to polymers made from lactones, oxalates, carbonates, polyanhydrides and hydroxyacids. Examples of such polymers include, but are not limited to homopolymers and copolymers of lactide, glycolide, hydroxybutyrate, hydroxyvalerate, dioxanone, trimethylene carbonate, caprolactone, polyethylene oxide or blends or mixtures of these homopolymers or copolymers. A copolymer of lactide and glycolide of approximately 75–90% lactide and approximately 10–25% glycolide is particularly adapted for molding by the above process. A preferred polymer is a copolymer of approximately 82% lactide and approximately 18% glycolide.

Preferably, a substantially void free article herein is about 95% to about 100% void free and more preferably about 98% to about 100% void free. Thus, use herein of the expressions "substantially void free" or "substantially free of internal voids" means from about 95% to about 100% free of void space in a polymer of a polymeric article. It should be understood that the expressions "void free", "substantially void free" or the like apply to the polymeric composition itself. Consequently a substantially void free polymeric rod may include a core which is partially or completely hollow, e.g., a tube.

In another aspect, oriented cannulated biocompatable polymeric articles are provided. Such articles are particularly useful in surgical repair and reconstruction. Oriented cannulated bioabsorbable surgical fixation devices such as tacks, pins, screws, nails, bolts and rods possess mechanical properties, e.g., tensile strength and elastic modulus that are particularly suitable for surgical repair of bone, cartilage and ligaments. The optional use of substantially void-free polymeric bodies further strengthens oriented articles.

As was discussed above, cannulated substantially void-free polymeric bodies can be produced and used for stock. The polymeric bodies may be of many different shapes as described. The stock may then be oriented and optionally subjected to further shaping to form cannulated surgical fixation devices. It should be noted that oriented cannulated surgical fixation devices made in accordance herein need not necessarily incorporate the herein-disclosed process for making substantially void-free polymeric articles. Cannulated polymeric bodies which are oriented as described herein can be formed by conventional extrusion or molding techniques prior to such orientation.

In one embodiment, orientation of the cannulated polymeric body is accomplished by heating a polymeric body to above its glass transition temperature but below its melting point and drawing or pulling the cannulated polymeric body axially from about 2 to about 10 times. The cannulated polymeric body may be oriented by stretching, i.e., by exerting diametric force at both ends of the body or, more preferably, by passing the body through a die of substantially similar cross-sectional, though smaller, aspect. The polymeric body is forced to deform to a diameter that is smaller than the diameter of die. The resulting cannula is also deformed to a smaller diameter.

For example, unoriented cylindrical tubing made from an amorphous copolymer of glycolide and lactide is heated to above its glass transition temperature. The tube is oriented in the axial direction by pulling through a conical die. The resulting oriented polymeric article deforms to a diameter smaller than the original tube while retaining a cannula which is smaller in diameter than the original cannula.

The internal diameter size of the cannulated polymeric body may be controlled through use of an internal mandrel which can be placed in the cannula of the original polymeric body prior to drawing the body through the die. As the body is drawn, the mandrel constrains the inner diameter to the desired dimension. In this way, if desired, the diameter of the cannula can be made to vary in relation to the exterior diameter.

Figure 3:
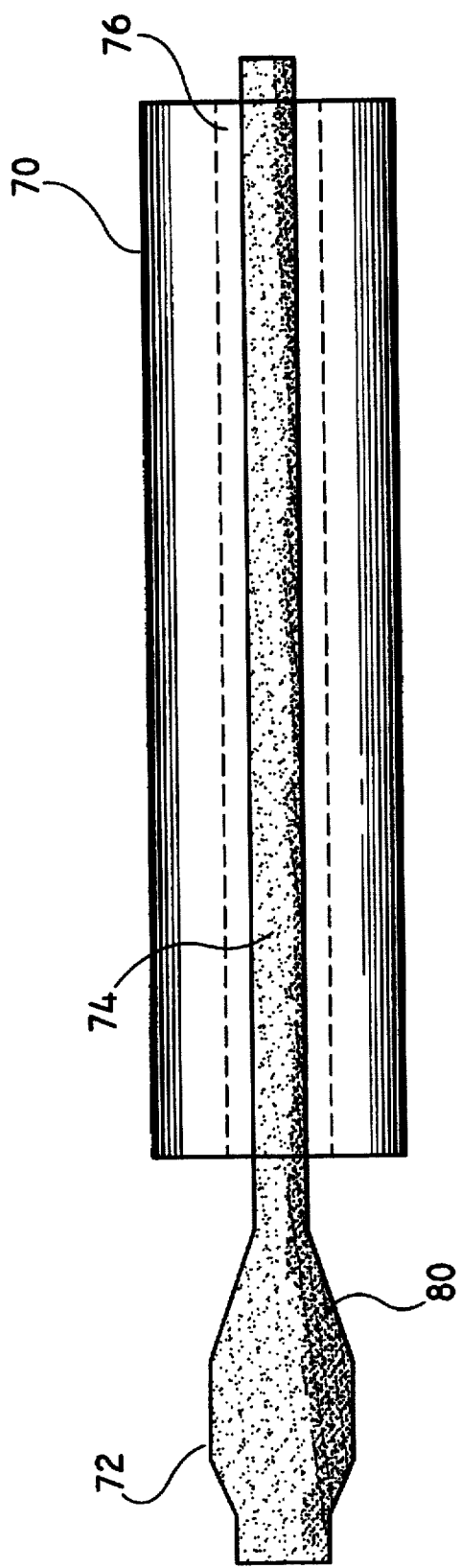
FIG. 3 is a schematic representation of a portion of an apparatus used for orienting cannulated stock material herein.
Figure 4:
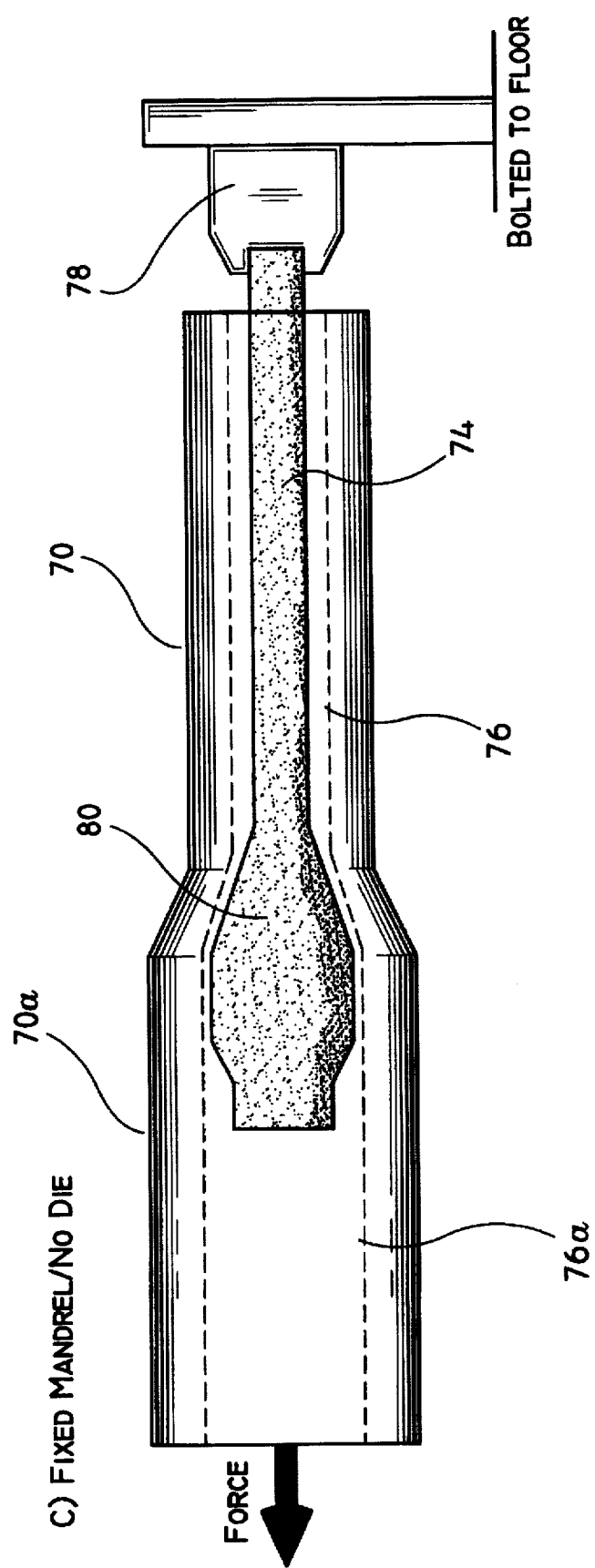
FIG. 4 is a schematic representation of an apparatus used for orienting cannulated stock material herein.

In one embodiment, radial orientation of the polymer is achieved. The schematic illustrations of FIGS. 3 and 4 depict an apparatus for radial orientation of cannulated stock material 70. The stock material 70 is drawn over a mandrel 72 to radially orient amorphous stock material 70. More particularly, the shaft 74 of the mandrel 72 is placed into and through the interior cannula 76 (illustrated between the dotted lines in FIGS. 3–5). The end of the shaft 72 which protrudes past the end of the unoriented stock material 70 is releasably mounted to support member 78 (see FIG. 4).

The end of the stock material 70 which is closest to the head 80 of the mandrel 72, i.e., the leading portion of the stock material, is heated to soften the end sufficiently to facilitate drawing the stock material 70 over the head 80. The temperature of the leading portion may be varied depending on the polymeric composition of the stock material 70. The leading portion should be heated above the glass transition temperature and to about 5°–30° C. below the initial melting point of the polymer. The mandrel 72 may be heated to facilitate radial orientation of the stock material 70. The rest of the stock material is heated to above the glass transition temperature, but below the initial melting temperature and is preferably maintained below the temperature of the leading portion.

When appropriate temperatures are reached, the unoriented stock material 70 is drawn or pulled over the head 80 of the mandrel 72 to radially orient the stock material 70a. As can be seen from FIG. 4, the exterior diameter of the stock material 70a and the interior diameter 76a increase during the orientation process. The diameter of the oriented stock material can be radially expanded from about 2 times to about 10 times the diameter of the original stock material. After the oriented, cannulated polymeric article is completely drawn over the mandrel 72, it is allowed to cool to ambient temperature and may then be subjected to further processing.

Figure 5:
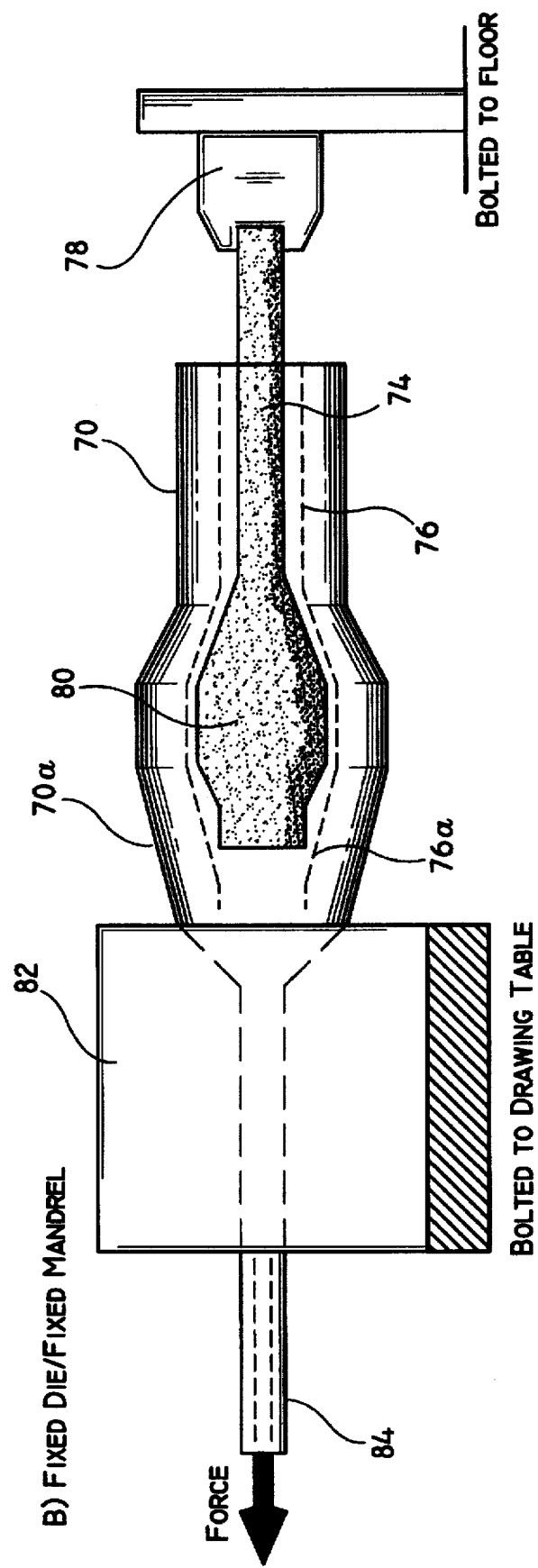
FIG. 5 is a schematic representation of an apparatus used for orienting cannulated stock material according to a further embodiment herein.

In another embodiment, both radial and axial orientation of polymeric bodies is achieved. To accomplish both radial and axial orientation, the unoriented stock material 70 is radially oriented as above. When the radially oriented stock material 70a is drawn or pulled past the mandrel 72, as illustrated in FIG. 5, it is drawn or pulled into a convergent die 82 which orients the radially oriented stock material in the axial direction to yield a radially and axially oriented polymeric article 84. The amount of axial expansion may range from 2x to 10x. As can be seen from FIG. 5, both the interior diameter and the exterior diameter of the radially oriented stock material 70a is reduced after axial orientation.

The amount of axial expansion is determined by the interior diameter of the convergent die 82. Thus, by increasing the diameter of the die, axial expansion is decreased. Conversely, by decreasing the diameter of the die, axial expansion is increased. While the shapes depicted in FIG. 3–5 are generally circular, it is contemplated that the mandrel and/or die may be formed as other shapes such as ellipsoidal, rectangular, polygonal etc. It is also contemplated that the die may be a different shape than the mandrel. The polymeric stock material may also have various cross-sectional shapes. It should be understood that unoriented stock material may first be expanded axially and then expanded radially to yield a polymeric article having axial and radial orientation. It is also contemplated that a series of radial orientation steps may be interspersed with a series of axial orientation steps. The convergent die 82 may be separately heated to help maintain the appropriate temperature for orientation.

The following examples are provided for purposes of illustration. These examples should not be construed as limiting the scope of the present disclosure in any manner.

EXAMPLE 1

A one inch inside diameter Teflon® tube was attached to a plenum assembly which allowed the interior of the tube to be selectively subjected to either reduced pressure (vacuum) or pressurized dry nitrogen while being placed inside a convection oven. The interior of the tube was filled with 800 gms pelletized plastic copolymeric resin (82% lactide and 18% glycolide). The tube was evacuated overnight at 60° C. The next morning, the temperature on the convection oven was increased to 190° C. and the tube was pressurized with dry nitrogen to slightly above ambient pressure. After approximately 45 minutes the pressure of the dry nitrogen was increased to 50 psi. After approximately seven additional minutes, the pressure of the nitrogen was slowly decreased to just above ambient pressure and the heating elements within the oven were turned off. The tube was allowed to slowly cool to room temperature. The one inch diameter solid resorbable rod was removed from the teflon tube.

EXAMPLE 2

A 1.25 inch Killion™ extruder was modified to accept a die which forced the normally horizontal flow of polymer around a 90° radius such that the flow was in the upward direction. The outlet section of the die was attached to the bottom of a one inch inside diameter teflon tube. The hopper of the extruder was modified to allow the material to be evacuated within a convection oven. The hopper was charged with 5000 gms pelletized copolymeric resin (18% glycolide and 82% lactide). The resin was staged and dried within the hopper. The hopper was then transferred to the feed section of the modified extruder and the extruder temperatures were set to 185° C. Once the extruder temperatures were equilibrated, the bottom of the hopper was opened and the pelletized resin was allowed to flow into the feed section of the extruder. The extruder motor controller was set to 30 RPM and the polymeric resin was extruded into the teflon tube. Once filled, the extruder was stopped, the filled tube removed, and a second tube placed onto the outlet of the die. This continued until the resin was exhausted. After cooling, the solid one inch diameter resorbable rods were removed from the teflon tubes.

Figure 6:
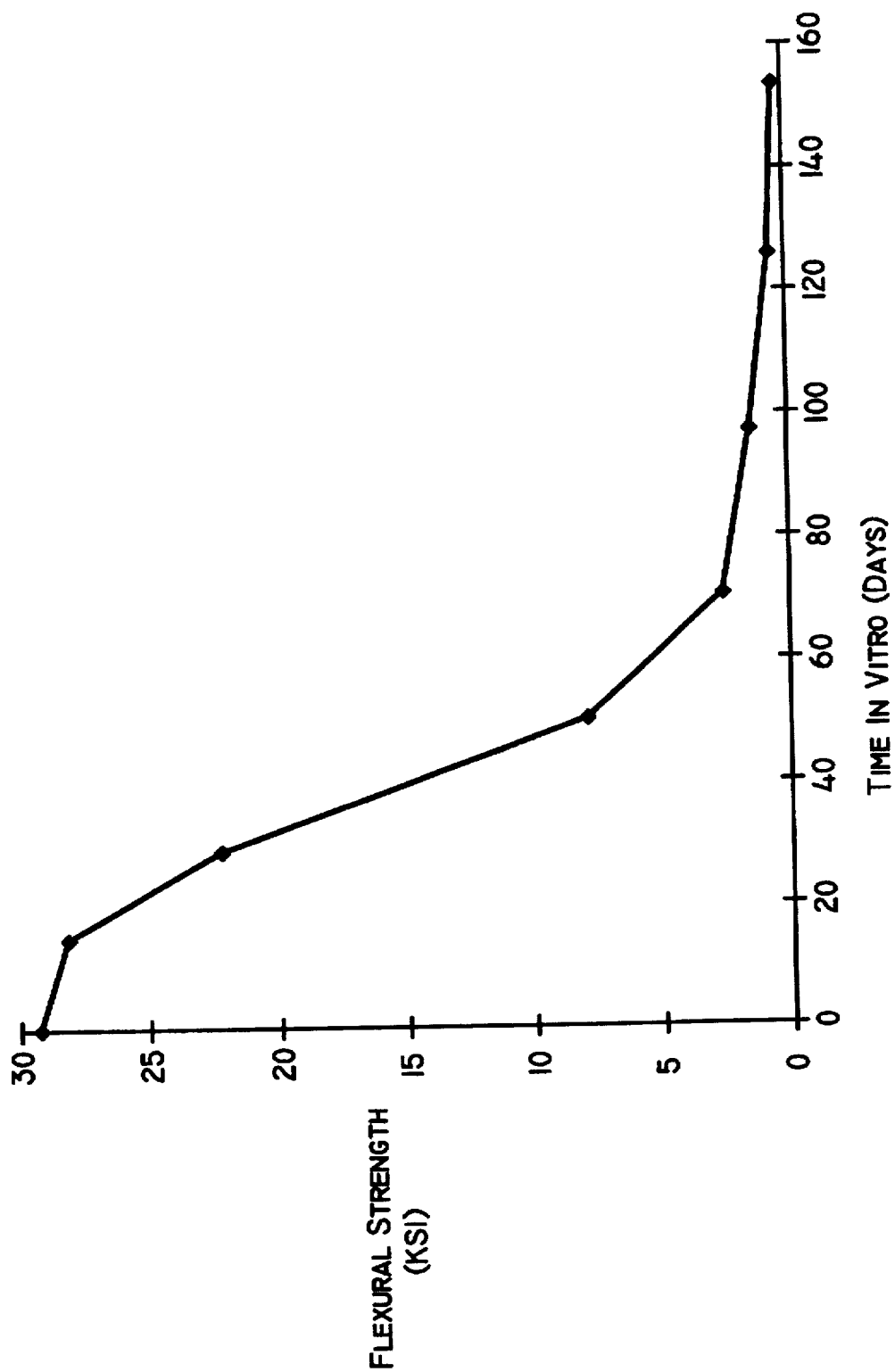
FIG. 6 graphically illustrates the relationship between flexural strength and time in vitro of a void-free rod made in accordance with the present disclosure.
Figure 7:
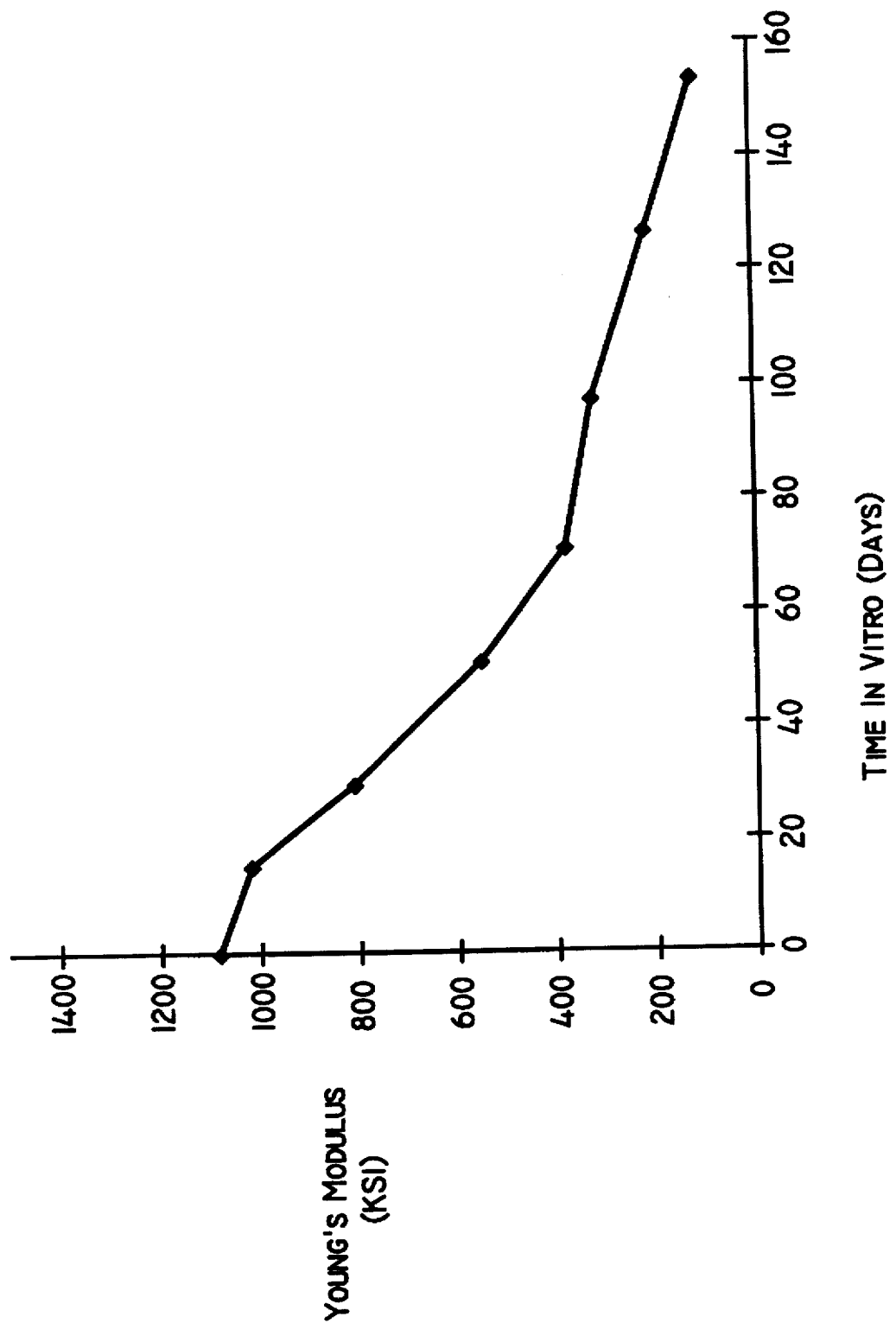
FIG. 7 graphically illustrates the relationship between Young's Modulus and time in vitro of a void-free rod made in accordance with the present disclosure.
Figure 8:
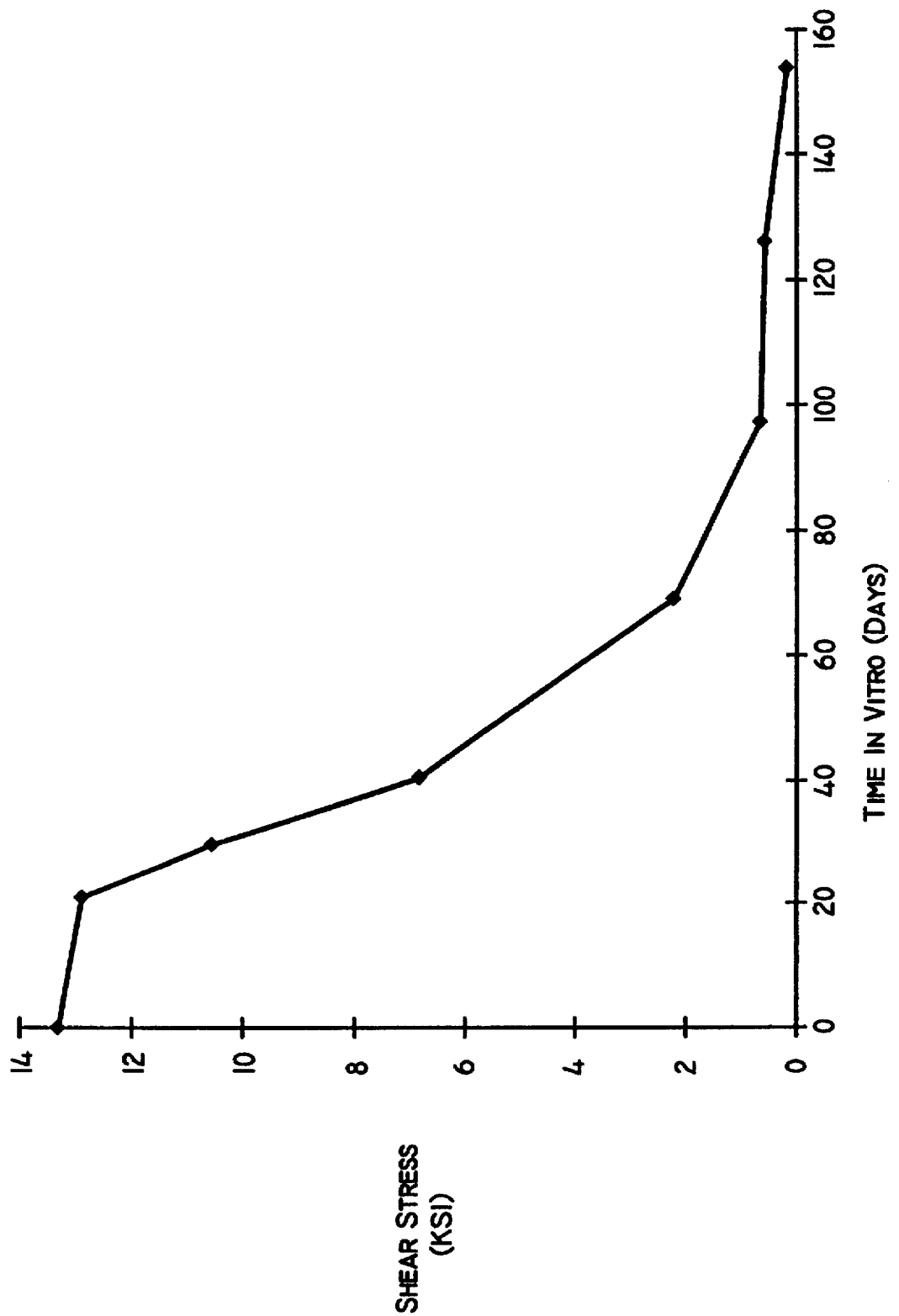
FIG. 8 graphically illustrates the relationship between shear stress and time in vitro of a void-free rod made in accordance with the present disclosure.

The resorbable rods were than tested to determine the in vitro relationship between flexural strength over time (ASTM D790), Young's Modulus over time (ASTM D790), and shear stress over time (ASTM B565). FIG. 6 graphically illustrates the relationship between flexural strength and time in vitro of the resorbable rod. FIG. 7 graphically illustrates the relationship between Young's Modulus and time in vitro of the resorbable rod. FIG. 8 graphically illustrates the relationship between shear stress and time in vitro of the resorbable rod.

EXAMPLE 3

A 1.25 inch Killion™ extruder was modified to accept a die which forced the normally horizontal flow of polymer around a 90° radius such that the flow was in the upward direction. The outlet section of the die was attached to the bottom of a one inch inside diameter teflon tube. The hopper of the extruder was modified to allow the material to be evacuated within a convection oven. The hopper is charged with 5000 gms pelletized copolymeric resin (18% glycolide and 82% lactide). The resin is staged and dried within the hopper. The hopper is then transferred to the feed section of the modified extruder and the extruder temperatures are set to 185° C. Once the extruder temperatures is equilibrated, the bottom of the hopper is opened and the pelletized resin is allowed to flow into the feed section of the extruder. The extruder motor controller is set to 30 RPM and the polymeric resin is extruded into the teflon tube. The teflon tube contains a teflon coated rod of one half inch diameter mounted coaxially therein such that the extruded polymeric resin surrounds the teflon coated rod. Once filled, the extruder is stopped, the filled tube is removed, and a second tube placed onto the outlet of the die. This is continued until the resin is exhausted. After cooling, the one inch diameter resorbable tubes and teflon coated rod are removed from the teflon tubes. The teflon coated rod is then removed from the resorbable tube.

EXAMPLE 4

A copolymeric resorbable resin (18% glycolide and 82% lactide) was extruded into thick walled tubing with the approximate dimensions of: O.D.=0.5 inches and I.D.=0.12 inches. This material was heated to approximately 85° C. and drawn through a 0.300" diameter die at a speed of approximately 3 inches per minute. The resulting material had an O.D. of 0.295" and I.D. of 0.030".

EXAMPLE 5

A copolymeric resorable resin (18% glycolide and 82% lactide) is extruded into thick walled tubing with the approximate dimensions of: O.D.=0.5 inches and I.D.=0.12 inches. This material is heated to approximately 85° C., a 0.20 inch diameter round mandrel is positioned at the opening of the tube and the tube is drawn over the mandrel at a speed of approximately 3 inches per minute. The resulting material will have an interior diameter of about 0.21 inches.

EXAMPLE 6

A copolymeric resorbable resin (18% glycolide and 82% lactide) is extruded into thick walled tubing with the approximate dimensions of: O.D.=0.5 inches and I.D.=0.12 inches. This material is heated to approximately 85° C. and is drawn through a 0.300 inch diameter die at a speed of approximately 3 inches per minute. The resulting material has an O.D. of 0.295 inches and an I.D. of 0.030 inches. The resulting material is heated approximately to 85° C., a 0.1 inch diameter round mandrel is positioned at the opening of the tube and the tube is drawn over the mandrel at a speed of about 3 inches per minute. The resulting material will have an I.D. of about 0.11 inches.

It will be understood that various modifications may be made to the embodiments and aspects disclosed herein. Therefore the above description should not be construed as limiting, but merely as exemplifications of preferred embodiments. Those skilled in the art will envision modifications within the scope and spirit of the claims appended hereto.

What is claimed is:

1. A process for making polymeric articles comprising:
   forming a melt of a polymer;
   extruding said polymer melt through a die to form a polymeric extrudate;
   directly discharging the polymeric extrudate vertically upward into an open-ended mold to form a biocompatable polymezic article adapted to be implanted into a living organism, the open-ended mold having a longitudinal axis oriented substantially parallel to the direction of flow of the polymeric extrudate;
   removing the polymeric article from the mold; and
   cooling the polymeric article.

2. A process for making polymeric articles according to claim 1 wherein the cooling is performed within the mold.

3. A process for making polymeric articles according to claim 1 wherein the polymeric article is a substantially void-free cylindrical polymer rod.

4. A process for making polymeric articles according to claim 3 wherein the polymer rod is cannulated and substantially void free.

5. A process for making polymeric articles according to claim 1 wherein the polymer is bioabsorbable.

6. A process for making polymeric articles according to claim 1 wherein the mold is heated.

7. A method of treating a polymeric stock material comprising providing polymeric stock material having a core which is at least partially hollow and orienting the polymeric stock material radially wherein the resulting radially oriented polymeric stock material is biocompatible and adapted to implanted into a living organism.

8. A process for making a polymeric article comprising;

loading a mold with biocompatable polymeric particles;

orienting the mold such that its longitudinal axis is substantially vertical;

drawing a vacuum on the loaded mold;

eating the loaded mold above the melting point of the polymeric particles;

pressurizing the loaded mold with an inert gas to above ambient pressure; and cooling the loaded mold to form a polymeric article adapted to be implanted into a living organism.

9. A process for making a polymeric article according to claim 8 wherein said mold forms a cylindrical rod.

10. A process for making a polymeric article according to claim 8 wherein said mold forms a cannulated rod.

11. A process for making polymeric articles according to claim 8 wherein the polymer is bioabsorbable.

12. A process for making a polymeric article according to claim 8 wherein the polymer in the polymeric article is substantially free of internal voids.

13. A process for making a polymeric article according to claim 8 further comprising differential melting of the polymeric particles along the mold length.

14. A process for making a polymeric article according to claim 13 wherein said differential melting is accomplished by differential heating along the mold length.

15. A method according to claim 7 further comprising orienting the stock material axially.

* * * * *